United States Patent [19]

Basile et al.

[11] Patent Number: 4,466,342

[45] Date of Patent: Aug. 21, 1984

[54] CARBONATION CHAMBER WITH SPARGER FOR BEVERAGE CARBONATION

[75] Inventors: Peter A. Basile, Hudson, Ohio; Clara Ann Annese, Hamilton Square; Dennis J. Colwell, East Windsor, both of N.J.

[73] Assignee: General Foods Corporation, White Plains, N.Y.

[21] Appl. No.: 468,235

[22] Filed: Feb. 22, 1983

[51] Int. Cl.³ ............................................. A23L 2/40
[52] U.S. Cl. ........................... 99/323.1; 261/DIG. 7; 426/591
[58] Field of Search .................... 99/275, 323.1, 323.2; 261/DIG. 7, 121 R, 18 R; 426/591, 561, 477, 78, 86; 220/23

[56] References Cited

U.S. PATENT DOCUMENTS 2,600,901 6/1952 Meldau ........................ 261/DIG. 7
2,805,846 9/1957 Dewan ........................ 261/DIG. 7
4,316,409 2/1982 Adams ................................ 99/275
4,399,744 8/1983 Ogden ................................ 99/323.1

Primary Examiner—Robert W. Jenkins
Attorney, Agent, or Firm—Thomas R. Savoie; Daniel J. Donovan

[57] ABSTRACT

An improvement in a pressurizable container used to prepare a carbonated beverage from a water-based liquid and carbon dioxide generating chemical reactants comprises the use of a carbonation chamber having an upper compartment for holding the chemical couple and a lower compartment with a bottom sparger surface for releasing, as uniformly small bubbles, the generated carbon dioxide into a beverage to be carbonated. The bottom sparger surface permits the rapid carbonation of a beverage without agitation and also minimizes the transfer of the resultant products of the chemical reaction to the beverage.

10 Claims, 3 Drawing Figures

CARBONATION CHAMBER WITH SPARGER FOR BEVERAGE CARBONATION

BACKGROUND OF THE INVENTION

1. Field of the Invention

The present invention relates generally to a container for the preparation of carbonated liquids and more particularly pertains to a container enabling consumer preparation of carbonated beverages, either at home or as otherwise convenient, having substantially the same palatability and effervescence as bottled or canned carbonated beverages. In greater detail, the present invention relates to a container designed to efficiently prepare a carbonated beverage from an effervescent acid carbonate couple using a carbonation chamber having a bottom sparger surface for releasing generated carbon dioxide into a beverage while providing for separation from the beverage of the resultant salts of the carbonation reaction.

2. Discussion of the Prior Art

Prior art approaches to commercialize point-of-consumption or at-home preparation of carbonated beverages have not met with sustained success over the years. The principal shortcoming of the several techniques available in the art is that consumer-prepared carbonated beverages have been significantly inferior in one or more aspects to bottled or canned carbonated beverages available in stores or supermarkets. Common complaints leveled at carbonated beverages prepared by consumers are that the quality and quantity of the carbonation (the bubble size and duration of effervescence) do not compare favorably with commercially available, bottled carbonated beverages, and that the palatability of the beverages suffer from the adverse effects of the carbonating reactants, when that approach to carbonation is pursued.

However, consumer preparation of carbonated beverages offers significant advantages over prepared package liquid carbonated beverages for several reasons: the requirement for glass, metal or other bulky containers is avoided; the steps of bottling, shipping and storing carbonated beverages consisting of a major percentage of water are eliminated, and accordingly the utility in terms of portability to the use is greatly enhanced. Thus, homemakers, campers, backpackers, hunters, fishermen, outdoor spectators and travellers can enjoy a carbonated beverage without having to transport bulky and heavy quantities of canned or bottled drinks. Further, disposable or returnable cans and bottles would no longer be of major concern to environmentalist who have been seeking ways to conserve both the country's natural resources and beauty.

The art or concept of carbonating a beverage by the addition of water or suitable liquids to dry chemicals is well developed in the prior art technology. Some of the earlier publications in this field recommend admixing an acid, such as tartaric acid, with a carbonate, such as baking soda, and a flavoring so as to produce a carbonated beverage when the mix is dissolved in water. A carbonation system of this nature is generally economical to produce, and affords availability of a wide choice of safe carbonates and acids which are constituted of commonly used food ingredients. Moreover, many carbonates and acids have properties which are compatible with those of other commonly used ingredients in dry beverage mixes.

Unfortunately, a carbonation system of this type is subject to several disadvantages and drawbacks. The rate of carbonation of the beverage is often unsatisfactory, such as when the powder is admixed with water, which results in an initial excessive liberation of carbon dioxide, producing attendant foaming of the beverage, followed by a period of diminishing gas generation in which the carbonation of the beverage is at an inadequate level. Further, the taste of the resultant beverage is often adversely affected by the products which are formed during the chemical carbonation reaction so as to produce a salty, acidic tasting beverage. Also, the visual appearance of the beverage is frequently adversely affected by being rendered murky through the presence of undissolved salts which are formed during the reaction. Furthermore, the shelf life of the dry mix is often of an insufficient duration so as to render the dry mix unsuitable for numerous commercial applications.

Many approaches have been suggested by the prior art which are designed to overcome the aforementioned deficiencies. For instance, it has been suggested that the carbonation rate may be controlled by the application of coating agents, such as gums, to the dry powders, or by applying special granulation techniques to the powders. Additionally, the taste and appearance of dry mix beverages have been improved by the introduction of numerous new acidic and carbonate compounds. Further, the shelf life of the dry mixture has been extended by applying agglomeration and other blending techniques to the mixture and by protecting the carbonating compounds with chemical agents.

The patent art also includes a significant number of dry compositions for use in preparing carbonated beverages at home. In most of these compositions, sources of carbonate and acid are combined with sweeteners and a source of flavor so that upon addition of the composition to a glass of water, the materials react to yield carbon dioxide, thereby resulting in carbonation of the beverage. Alther U.S. Pat. No. 2,603,569 discloses the carbonation of a citric acid-sucrose complex with a sodium bicarbonate-sucrose complex. Hughes U.S. Pat. No. 2,742,363 discloses the use of the combination of an alkali metal bicarbonate and a sulfonic acid ion exchange resin in its hydrogen form. Diller U.S. Pat. Nos. 2,851,359 and 2,953,459 disclose the combination of a highly soluble phosphate and a slowly soluble phosphate with an alkali metal or ammonium carbonate or bicarbonate to prolong the ebullition of the beverage. Mitchell et al U.S. Pat. No. 3,241,977 discloses chemical carbonation with citric, adipic or tartaric acid in a finely divided form, which are alleged to approximate the carbonation sensation of cola-type beverages sold in air-tight bottles or cans and produced by a saturated solution containing several volumes of carbon dioxide. Feldman et al U.S. Pat. No. 3,441,417 discloses a dry beverage composition adapted to be reconstituted with water to produce an effervescent beverage. The composition includes an essential carbonating ingredient, an organic compound having a carbonic acid anhydride group, capable of controlled hydrolysis in water to release carbon dioxide at a substantially uniform rate. Fritzberg et al U.S. Pat. No. 3,667,962 discloses a carbonation composition utilizing two distinct bodies formed from an aqueous solution of a saccharide, one containing an edible food acid and the other an edible bicarbonate. Upon addition to water, the two tablets dissolve quickly and react to produce carbon dioxide.

Many of the dry powder chemical mixtures have a common and acknowledged defect, an unpleasant taste in the beverage directly resulting from the components of the powder. Hughes U.S. Pat. No. 2,742,363 and Hovey U.S. Pat. No. 3,476,520 attempt to solve this problem by placing the chemicals in a container which is pervious to gas and water but impervious to solid reactants and by-products, as explained in further detail, infra. Barnes et al U.S. Pat. No. 2,975,603 takes another approach by utilizing carbonated ice containing at least 25 milliliters of carbon dioxide per gram of ice as the source of carbonation. Sampson et al U.S. Pat. Nos. 3,888,998 and Whyte et al 3,992,493 and 4,025,655 and Liepa et al 4,007,134, 4,110,255 and 4,147,808 disclose various carbonation methods, compositions and devices whereby carbon dioxide containing molecular sieves are used to carbonate aqueous solutions.

U.S. Pat. No. 4,316,409 issued Feb. 23, 1983 for Carbonated Beverage Container and U.S. Pat. No. 4,285,977, issued Aug. 25, 1981 for Process for Preparing Carbonated Liquids and both commonly assigned herewith, are also considered to be pertinent to the present invention. U.S. Pat. No. 4,316,409 discloses a closed pressurized container for producing a carbonated beverage by providing for contact therein of water and a briquette of carbonated ice. The pressurized container is a rigid receptable in the shape of a wide mouth bottle adapted to receive a large cap or cover. A perforated basket is mounted inside the cover, and is accessible to water in the bottle when that vessel is turned upside down to an inverted position. A spring loaded, manually operated valve is provided in the cover to permit venting of carbon dioxide from the interior thereof after the water-based mixture within the container has become sufficiently carbonated by absorbing carbon dioxide released by contact of water with the carbonated ice briquette. U.S. Pat. No. 4,285,977 covers the process for carbonation using such a container.

Madsen U.S. Pat. No. 2,205,147 illustrates a carbonating container wherein a tablet of acid such as citric acid and a tablet of bicarbonate of soda are introduced into a compartment at the top of the container, from which the tablets are dispensed by the use into separate water-containing chambers in the container. The separated acid and carbonate components are mixed upon tilting of the container, which results in pouring of equal quantities of each into a glass. No attempt is made herein to separate the salts of the reaction from the resultant carbonated beverage.

Hughes U.S. Pat. No. 2,742,363 discloses a cup type of container having a quantity of ion exchange resin and other materials in the base thereof which includes an acid and an alkali metal bicarbonate. After mixing with water, a filter member is moved to an extended position across the cup which permits the resultant beverage to pass therethrough but traps resin particles employed in the production of carbonic acid.

Hovey U.S. Pat. No. 3,492,671 illustrates a container for producing carbonated beverages from water and reactants such as sodium bicarbonate and citric acid in which the reactants are placed within a cylindrical hollow member which is then inserted into the container. A filter of sintered glass is positioned at the top of the cylindrical member to permit carbon dioxide to pass therethrough, but retains in the cylindrical member the salts and other by-products of the chemical reaction. Although the object of this patent is similar to that of the present invention, the structure designed to achieve that result is substantially different therefrom.

Particularly, use of porous carbonators is also suggested by applications of Mott Porous Metal Structures, pages 7, 9–11 of the Mott Metallurgical Corporation Catalog No. 1000, "Introduction to Engineering Controlled Porosity Products" but the application to beverage carbonation and the device described herein is not suggested.

Buchel U.S. Pat. No. 4,186,215 discloses a cup type of container having a pressure chamber at its base with a carbonation mixture therein such as sodium bicarbonate and citric acid. A permeable membrane covers the top of the chamber and allows water to slowly enter the chamber and carbon dioxide to pass therethrough in a pressure equalized reaction to carbonate a beverage over a sustained period of time. The membrane also prevents the resultant salts of the reaction from being absorbed in the beverage as the amount of water passing into the chamber is insufficient to accomplish this purpose. The operation of Buchel is substantially different from that of the present invention in terms of preventing resultant salts of the chemical reaction from contaminating a beverage.

Despite many attempts in the prior art to develop a system for the preparation of a satisfactory carbonated beverage in the home, none have succeeded in producing a carbonated product equal in flavor, taste, appearance, and quality and quantity of carbonation to commercially packaged, liquid carbonated beverages as are available in retail stores and supermarkets.

SUMMARY OF THE INVENTION

As used herein, the phrase "chemical couple" is used interchangeably with "chemical reactants" and is meant to include all known, non-toxic carbonates and acids that are capable of generating carbon dioxide when reacted in the presence of water. The carbonates and acids herein may also be commonly used food ingredients.

Accordingly, it is a primary object of the present invention to provide a simple and efficiently designed container for the preparation of carbonated beverages having a carbonation quality and quantity equal to or better than that of commercially available carbonated beverages sold in a bottle or can.

A further object of the present invention is to provide a container for the preparation of a carbonated beverage from a carbon dioxide generating chemical couple, such as an acid carbonate couple, which minimizes transfer of the reaction products of the chemical couple to the beverage container therein.

Another object contemplated by the present invention is the provision of a pressurizable container for the preparation therein of a carbonated beverage from a water-based liquid and a carbon dioxide generating chemical couple. The container is particularly designed to minimize transfer to the beverage of the resultant products of the chemical reaction.

The container has a top opening to provide access to its contents, and a carbonation chamber is insertable therein. The carbonation chamber may be of any known design which holds the chemical couple and substantially isolates the resultant chemical products of the reaction to prevent their adversely affecting the palatability of the beverage. To this end, the chamber may have an upper compartment for holding the chemical couple and a quantity of water to promote the reaction.

It is essential that the chamber have a lower compartment with a bottom sparger surface for releasing the generated carbon dioxide into the beverage and a means to provide for the passage of $CO_2$ from the upper compartment to the lower compartment.

The essence of this invention is the use of a sparger surface at the bottom of the lower compartment to release carbon dioxide therethrough, as uniformly small bubbles to carbonate the beverage. The bottom sparger surface gives surprising and unexpected results when carbonating a beverage. Within less than an hour, usually 15 minutes, a one liter bottle of an aqueous beverage is carbonated to a commercially acceptable level, usually above 3.25, normally 3.5 or greater volumes of $CO_2$ per volume of beverage. A high volume of carbon dioxide gas is contained in the beverage without resorting to protracted carbonation time or the introduction of externally supplied mechanical energy to promote the solution of carbon dioxide gas in the beverage. Without the sparger device, satisfactory carbonation of the same quantity of beverage requires several hours, usually from about 12 to 24 hours because the gas bubbles are not readily dissolved by the liquid into which it is released but instead pass quickly through the liquid and create a gaseous pressure in the head space. It is believed that the gas bubbles are not readily absorbed by the liquid because they are too large and move too rapidly through the liquid, without going into the solution.

The chemical process which generates carbon dioxide gas tends to be pressure limiting at approximately 100 psi for the reactance use in development of this product. When pressures generated by undissolved gases reach 100 psi the reaction rate rapidly diminishes and carbon dioxide ceases to be released. The sparger has a novel effect in the carbonation cycle in the manner in which it influences the pressures generated by gas in the beverage head space.

At initial activation gas flow rates are substantial. The high rate of flow tends to cause the small bubbles exiting the sparger to agglomerate into larger bubbles which rise rapidly through the beverage and pressurize the head space more than they carbonate the beverage. As head space pressure increases, the reaction rate slows. As gas flow rates diminish, agglomeration ceases, and a stream of very fine bubbles of carbon dioxide are released from the sparger. These small bubbles rise very slowly through the beverage, tending to dissolve before they reach the head space. Therefore, carbonation levels are increasing while the head space pressure is remaining relatively unchanged. Because head space pressure is not rising, the reaction continues and the sparger continues to produce streams of small bubbles which allow the carbon dioxide gas to pass rapidly into the solution.

A second parallel beneficial effect also results from the sparger operation. Rapid productive pressurization of the head space increases the solubility of the carbonating gas. Since the sparger operates in a manner which causes the head space to reach optimum pressures rapidly, the period of time at which higher solubility due to higher pressures exists is extended and the total volume of dissolved gases increases.

Although this bubble size, head space pressure mechanism could be produced by a separate flow programming device, it was surprising to find that the natural operation of the sparger in this environment produced such a beneficial effect beyond just small bubble size.

In one embodiment, an internally threaded top closure is provided for engaging threads around the neck, and for sealing the access opening of the container. The closure has a flat top to provide a stable base for the covered container in an inverted position, and also includes a vent valve to allow venting of excessive carbon dioxide from the pressurized container prior to disengagement of the closure therefrom.

There are advantages in being able to invert the pressurized container during the generation of carbon dioxide gas because such an arrangement affords a natural separation of reactants and generated gas. The solid-liquid reactants generate carbon dioxide gas at a pressure of about 50–70 psig and the gas seeks to escape the reaction vessel in a path that offers the least resistance. Thus, an inverted reaction chamber permits gravitational forces to keep the more dense reaction mixture and chemical products in the reaction chamber while the generated gas is propelled out of the chamber, and if so directed, upward through the beverage to be carbonated.

In the disclosed embodiment the container is a wide-mouth bottle with a circular top opening, and the carbonation chamber is cylindrically shaped and has a diameter such that it fits snugly within the circular opening. A rim around the top of the carbonation chamber has a diameter greater than the circular opening such that the chamber is suspended in the container from the rim.

In greater detail, the one embodiment disclosed herein, consists of a carbonation chamber having cylindrically shaped upper and lower compartments separated by a disc shaped wall therebetween, and a tubular passageway which is centrally positioned through the separating wall. The closure has a centrally positioned tubular member depending therefrom which has a diameter to fit snugly within the tubular passageway upon tightening of the closure onto the beverage container.

An O ring is provided around the tubular member to form a seal relative to the tubular passageway. A plurality of gas communicating apertures extend through the tubular member above the upper end of the tubular passageway to allow carbon dioxide to pass from the upper chamber through the gas communicating apertures into the tubular member.

It is important that the gas communicating apertures remain free to receive the gas generated in the carbonation chamber. Thus, the apertures are positioned on the tubular passageway so that neither the liquid employed to promote the generation of carbon dioxide nor the reaction products of the gas generating chemical couple have easy access to the apertures. The apertures are positioned vertically above a projecting collar on the tubular passageway, said collar directs the aqueous mixture of $CO_2$ generating reactants away from the apertures as the container is shaken or inverted during the gas generating reaction. Also, when the container is inverted during the gas generating reaction the top closure has a sufficient volume to hold the reaction mixture so that the gas communicating apertures are above the level of the aqueous reaction mixture. The shape of carbonation chamber in the generator cap is important in assuring the beneficial effects of the novel sparger performance previously described. The carbonation chamber should have a deep well of small diameter to collect the reactance water in an area positioned immediately opposite the cup of dry reactance. At inversion this deep wall of water will cause the initial reaction to proceed very rapidly and assist the sparger in achieving initial high but controlled head space pressures. The gas communicating apertures are therefore, always free to "pick-off" the gas generated by the chemical couple. The gas that is "picked-off" by these apertures flows through the tubular passageway and then preferably through a one-way valve at the opposite end of the tube. The valve which may be in the form of the well-known duckbill valve, and all of the other structure in the carbonation chamber serves to prevent the passage therethrough of resultant chemical products.

The gas which exits the tubular passageway and/or valve subsequently travels through the bottom sparger surface into the beverage to be carbonated. The controlled injection of a fine dispersion of gas into the liquid material of this invention gives the surprising results claimed herein. Suitable spargers for this invention are those having pore sizes with diameters of less than 10 microns, preferably between 2.0 and 0.5 microns, more preferably between 0.3 and 1.0 micron. The materials of construction are not a limitation on the sparger of this invention; however, spargers made of sintered stainless steel are of the desired porosity and mechanical strength.

A container arrangement according to the present invention should incorporate certain minimum design criteria. It must be capable of withstanding the temperatures and pressures generated in the confined space of the container during preparation of the carbonated beverage from a source of carbonation and water. Temperatures of about 40° to 70° F. and pressures of about 40 to 90 psig are developed within the container pursuant to the teachings herein.

The container arrangement should also be provided with a convenient manner in which water and a carbonation source and, optionally, color, flavor and/or sweetener additives may be introduced therein. Further, the container should provide a convenient manner to pour or dispense the carbonated beverage therefrom after preparation. Ideally, the arrangement should be compact, lightweight and portable to facilitate usage in a variety of remote locations. These features are not necessary when the usage of the container arrangement is limited primarily to the home, but are desirable to provide a versatile product.

The size of the container is not critical, but for convenience should be available in a variety of sizes, so as to enable the preparation of from 1 glass to 2 liters or more of carbonated beverage. Additionally the container arrangement should be designed so as to be safely and easily usable by a school child or an adult and, further should be designed so that a pre-school or small child cannot readily use it or at least not injure himself in any attempt at usage.

Accordingly, it is a primary object of the present invention to provide a novel pressurizable vessel for the preparation of carbonated beverages.

Another object of the present invention lies in the provision of a pressurizable vessel for the preparation of a carbonated beverage in a convenient and relatively safe manner from a water-based liquid and an effervescent carbonating chemical couple.

BRIEF DESCRIPTION OF THE DRAWINGS

The foregoing objects and advantages of the present invention for a carbonated beverage container may be more readily understood by one skilled in the art with reference being had to the following detailed description of one embodiment thereof, taken in conjunction with the accompanying drawings wherein like elements are designated by identical reference numerals throughout the several drawings, and in which.

DETAILED DESCRIPTION OF THE DRAWINGS

Figure 1:
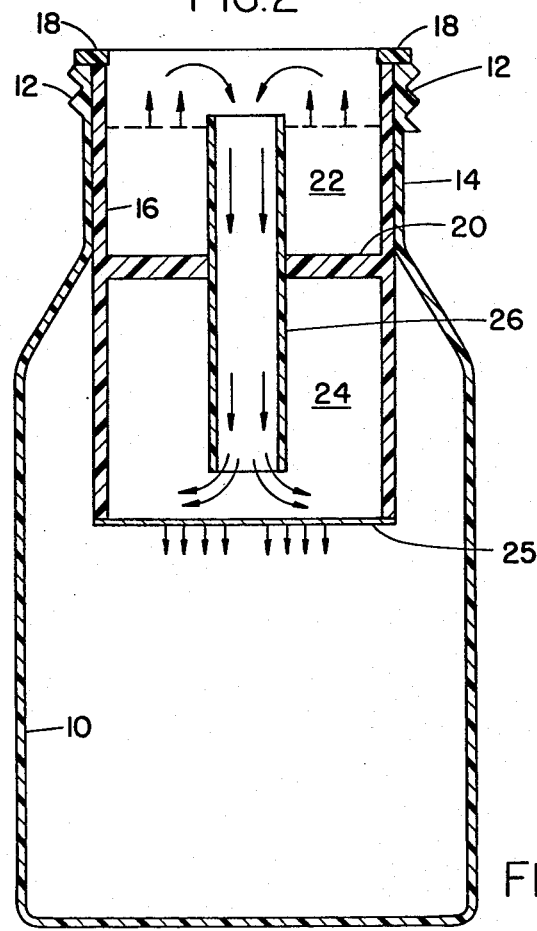
FIG. 1 is an elevational sectional view of an exemplary embodiment of a carbonated beverage container constructed pursuant to the teachings of the present invention.

Referring to the drawings in detail, FIG. 1 is an elevational sectional view of pressurizable container 10 which is constructed of a suitable material, such as polycarbonate plastic, noncorrosive metals such as stainless steel or polymeric resins such as polypropylene, to withstand the pressures generated internally of the container during carbonation of a beverage therein. Container 10 may have markings on its exterior surface indicating the levels to which the various ingredients, such as water, flavoring and ice, are to be added. Container 10 is illustrated as a wide-mouth vessel having a cylindrical neck 16, about the top of which external threads 12 are formed.

A cylindrically shaped carbonation chamber 16 is insertable into the neck 16 of the container, with the external diameter thereof being slightly smaller than the internal diameter of neck 14, such that a realtively snug fit is established. A radially projecting lip 18 is provided at the top of the carbonation chamber, such that the lip rests on the top rim of container 10, and the chamber 16 is supported thereby within the container. The carbonation chamber 16 is divided by a disc shaped surface 20 into an upper cylindrically shaped compartment 22 and a lower cylindrically shaped compartment 24. The base of lower compartment 24 is formed by a circular sparger member 25 which is porous to release carbon dioxide therethrough, when the container is in an inverted position, as uniformly small bubbles to carbonate a beverage within the container. Sparger materials are well known in the art, and are available commercially from, for instance, Mott Metallurgical Corp., Farmington, Conn. A tubular passageway 26 is centrally positioned in disc 20 to extend therethrough, and may provide for limited pressure communication between the upper and lower compartments 22 and 24 as explained in further detail below.

Figure 2:
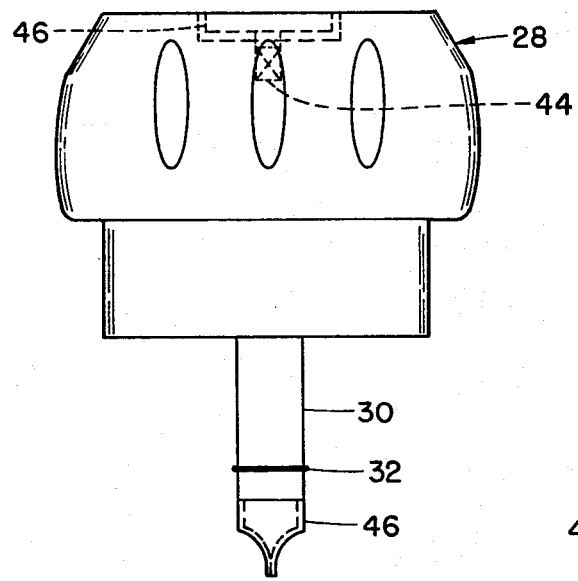
FIG. 2 illustrates an elevational view of a closure adapted to screw onto the container of FIG. 1.
Figure 3:
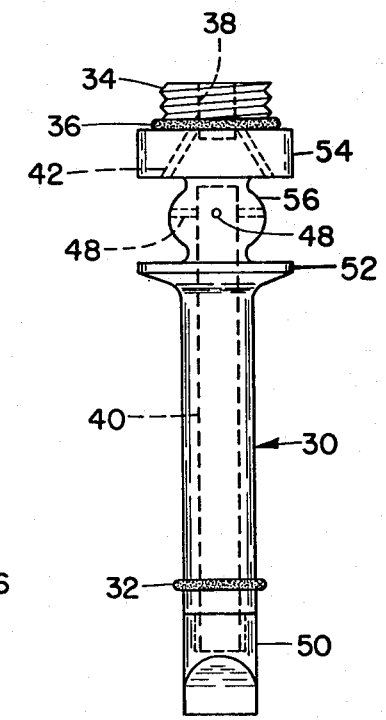
FIG. 3 is an elevational view of a tubular member which forms a portion of the closure shown in FIG. 2.

An internally threaded cover 28 is provided for engagement onto the externally threaded neck 14, and functions to seal the access opening of the container, with the rim 18 of the carbonation chamber positioned therebetween. A centrally disposed tubular member 30, illustrated in FIGS. 2 and 3, depends from the cover 28, and has a diameter such that it slides snugly within tubular passageway 26 upon tightening of the cover onto the container 10. A projecting collar 52 is integrally formed around the tubular passageway at a position which effectively shields the radially directed bores 48 from solid or liquid reactants and reaction products. The collar 52 also acts as an additional seal between the upper compartment 22 and the tubular passageway 26 upon tightening of the cover onto the container 10. An O ring 32 is positioned in an annular groove around tubular member 30 to form a seal between the tubular member 20 and its associated passageway 26. External threads 34 are provided around the top of tubular member 30 such that it may be threadedly secured within corresponding theads in cap 28, and an O ring seal 36 is provided immediately below the threads 34 to form a seal between the threadedly coupled components.

Tubular member 30 has a hollow upper section 38 and a hollow lower section 40 such that carbon dioxide gas may flow freely through each of the several sections as described below. In that respect, a plurality of relatively large diameter, upwardly directed radial bores 42 provide communication between the upper compartment 22 of the carbonation chamber and the upper section 38 of hollow tubular member 30 to a vent valve 44 in the top of the cover assembly 28. The vent valve 44 may be actuated by a valve actuator button 46 recessed in top of the cover, such that depressing of button 46 releases through valve 44 any excess pressure in the container. The recessed actuator button enables the covered container 10 to rest stably upon the top 28 of the container when it is placed in an inverted position during carbonation of a beverage, as described infra. Moreover, a plurality of relatively smaller diameter, radially directed bores 48 provide for venting of generated carbon dioxide from the upper compartment 22 of the carbonation chamber into lower inner bore 40, and then down therethrough for release through an elastic duckbill valve 50 into the lower compartment 24 of the carbonation chamber.

The collar 52 and corresponding collar 54 have an added function to protect the bores 48 from solid or liquid reactants when the container 10 is in either upright, inverted or other positions. The surface 56 is further designed to minimize reactants reaching bores 48. Hence the surface diameter at the bores is larger and convex to reduce collection of reactants at the bores and yet smaller than the diameter of collars 52 and 54 which are designed to act as umbrellas to protect the bores from the reactants.

In operation, selected quantities of water, flavoring and ice, are placed in open container 10. A quantity of a carbonating chemical couple, for instance citric acid and sodium bicarbonate, is placed in the upper compartment of the carbonation chamber which is then placed in the top of the container. Water is then added to the upper compartment to initiate the carbonation reaction, and the closure is then screwed tightly onto the top of the container.

The sealed container may then be shaken, if desirable, and the container is inverted and placed down on its top for a period of time for example, 3 to 15 minutes. During this time period, the carbon dioxide released by the chemical couple flows under pressure through the gas communicating apertures 48 into bore 40, and then optionally through duckbill valve 50 or other restriction into the lower compartment 24. Alternatively, gas may flow directly from bore 40 to compartment 24. The gas is then released through the many small porous openings in the sparger surface 25 into the beverage mixture in the container, thereby resulting in its carbonation. During the carbonating reaction, the apertures 48, bore 40, duckbill valve 50 and sparger surface 25 all function to retain the chemical byproducts of the reaction from the carbonated beverage.

The upper compartment 16 of container 10 is also positioned so that when the container is inverted there is formed a pocket or well that collects both reactants and water in a confined area in the cap thus initiating a vigorous initial reaction which rapidly pressurizes the head space and insures higher levels of carbonation are reached in the beverage. This pocket or well is formed in the cap and is designed to produce a rapid initial reaction for head space pressurization followed by a sustained generation of moderate amounts of gas for carbonation. Too large a well defuses the reaction, pressurizes the head space less rapidly and results in a low carbonation level less than 3.5 and usually on the order of 3 volumes of gas per volume of beverage.

After the passage of a sufficient duration of time, the beverage container is then reinverted to an upright position. Valve actuator 46 is pushed to open valve 44, thereby releasing any positive pressure in the container through vent apertures 42 and valve 44 into the atmosphere. The closure 28 is then unscrewed from the container, the carbonating chamber removed therefrom, and the beverage served directly from the container. Alternatively, the carbonated beverage may be stored for future use by tightening the closure onto the container, which may then be placed into a refrigerator or elsewhere.

The water employed to prepare carbonated beverages according to the present invention may be any type of drinking water available to the user. Household tap water, bottled water, fresh drinking water from a campsite stream, etc. are examples of water available at point of consumption preparation of these carbonated beverages. It is obvious, of course, that the presence of chemicals and/or minerals in the water employed may detract from the flavor of the carbonated beverage perpared according to this invention and, in view of this, the user may wish to employ extremely pure water or at least water with little or no off-taste. Aside from such preferences, any available water of drinking quality may be employed to practice this invention.

This invention may be used to provide a supply of carbonated water similar to club soda. In one of its preferred embodiments, the user may employ this invention to prepare a variety of carbonated beverages. Color, flavorants and sweetening additives may, optionally, be added directly to the preparation apparatus. In this fashion, such familiar beverages as carbonated cola, carbonated root beer, carbonated lemon-lime soda, carbonated cream soda, etc. can be prepared at home. Only the ingenuity of the user, the availability of flavorants and the individual tastes of the consumer limit the variety of carbonated beverages which may be prepared by the present container arrangement.

While at least one embodiment and several variations thereon have been described in detail herein, it should be apparent that the teachings and disclosure of the present invention will suggest many other embodiments and variations to those skilled in this art.

What is claimed is:
1. A pressurizable container for preparing therein a carbonated beverage from a water-based liquid and carbon dioxide-generating, chemical reactants designed to rapidly carbonate the liquid without agitation, comprising:
  a. a container having an opening therein providing access to the contents thereof;
  b. A carbonation chamber, insertable into said opening in the container for holding therein the chemical reactants and for substantially isolating the resultant chemical products of the chemical reac- tion to prevent their adversely affecting the palatability of the beverage, said chamber having
(1) an upper compartment for holding therein the chemical reactants and a quantity of water to promote the reaction,
(2) a lower compartment having a bottom sparger for releasing the generated carbon dioxide into a beverage in the container, said sparger having a porosity controlled to provide a first rapid flow of gas through the beverage in the form of large bubbles of $CO_2$ generated from the chemical reaction and a second moderate flow of small bubbles which rapidly dissolve in the beverage without increasing head space pressure to the point the reaction stops said second moderate flow sufficient to carbonate to a level of 3.5 volumes or more of $CO_2$ per volume of the beverage,
(3) means to provide for the passage of $CO_2$ from said upper compartment to said lower compartment.

2. A pressurizable container as claimed in claim 1 wherein said bottom sparger surface releases carbon dioxide therethrough, as uniformly small bubbles to carbonate the liquid within the container within 30 minutes of initiating the reaction.

3. A pressurizable container as claimed in claim 2 wherein said bottom sparger surface has pores which are less than 10 microns in diameter.

4. A pressurizable container as claimed in claim 3 wherein said bottom sparger surface has pores which are from about 0.3–1.0 micron in diameter.

5. A pressurizable container as claimed in claim 1, said container having a circular opening in the top thereof, said carbonation chamber having a circular cross section with a diameter such that it fits snugly within said circular opening, and having a rim around the top thereof with a greater diameter than said circular opening such that the chamber is suspended in the container from said rim which is positioned on top of the circular opening.

6. A pressurizable container as claimed in claim 5, including a closure for engaging and sealing the access opening of the container, said closure having a flat top to provide a stable base for the covered container when it is placed in an inverted position, said closure designed to promote rapid wetting of reactants in a confined reaction area to accelerate initial head space pressurization.

7. A pressurizable container as claimed in claim 6, said container being a wide mouth bottle, and said container and closure both being threaded for engagement with each other.

8. A pressurizable container as claimed in claim 7, said container having a cylindrically shaped neck, said circular opening being in the top thereof, and said carbonation chamber being cylindrically shaped to fit snugly within said cylindrical neck.

9. A pressurizable container as claimed in claim 8, including a vent valve provided in said closure to allow venting of excessive carbon dioxide from the interior of the pressurized container prior to disengagement of the closure from the container.

10. A pressurizable container as claimed in claim 1 or 2, said container having a cylindrically shaped neck with said circular opening being in the top thereof, said carbonation chamber being cylindrically shaped to fit snugly within said cylindrical neck.

* * * * *